United States Patent

[11] 3,587,250

[72] Inventor  Nicholas M. Raskhodoff 5728 Euclid Street
              Cheverly, Md.
[21] Appl. No. 840,686
[22] Filed     July 10, 1969
[45] Patented  June 28, 1971

[54] PHASE ADJUSTING COUPLING
     1 Claim, 3 Drawing Figs.
[52] U.S. Cl. .................................................. 64/24,
                                                            64/32
[51] Int. Cl. .................................................. F16d 3/10
[50] Field of Search .......................................... 64/24, 32;
                                                 287/52.08; 225/97; 74/395

[56]                References Cited
                UNITED STATES PATENTS
     2,614,872  10/1952  Heidegger ................ 287/52.08
     3,198,894   8/1965  Krug .......................... 287/52.08
     3,387,465   6/1968  Walker ........................ 64/24

*Primary Examiner*—Mark M. Newman
*Assistant Examiner*—Randall Heald

ABSTRACT: Coupling means interposed between two-in-line shafts which couple said shafts and provide phasing adjustment between said coupled shafts.

PATENTED JUN28 1971 3,587,250

INVENTOR
NICHOLAS M. RASKHODOFF

PHASE ADJUSTING COUPLING

BACKGROUND OF THE INVENTION

The present invention relates generally to coupling means and more particularly to a coupling device having improved means for adjusting the phasing relationship of two adjacent shafts or the like.

In order to achieve a highly accurate phasing relationship between shaft terminations of electrical or mechanical components it is necessary to provide suitable means to readily secure such an adjustment.

Means for accomplishing this have been described in my previous patent U.S. Pat. No. 3,024,629, granted on Mar. 13, 1962. Therein a worm screw and a worm wheel combination is used to angularly reposition a coupling hub rigidly affixed to a driven shaft. This coupling hub in turn is mechanically coupled to a second coupling hub that is rigidly secured to the driving shaft.

SUMMARY OF THE INVENTION

The present invention is particularly directed to an improvement in the type of phase changing device disclosed in my previous patent. A concealed headed worm is used instead of a headed adjusting screw. The worm is disposed in a transverse counterbored hole in the outer adjustment member of the coupling assembly and is prevented from longitudinal axial movement in either direction by a retainer pin located in an annular groove at one end of the worm and perpendicular to it. The worm is additionally spring loaded in one axial direction by a flexible washer, such as a spherical segment spring washer or a compressible rubber washer. Such a washer compensates for normal manufacturing tolerances in pin diameter and worm annular groove width, thus eliminating or minimizing backlash between worm and worm gear.

In addition to providing a novel means for positively retaining the worm the present invention gives a clean cut appearance at the outer adjustment member. The external retaining ring for the adjusting screw has been eliminated while the slot-type head of the adjusting worm is partially concealed. Yet the adjusting worm is readily accessible for adjustment purposes by an ordinary screw driver instead of requiring a special tool for this purpose as specified in U.S. Pat. No. 3,387,465 for a phase changing device. The flexible washer used to spring-load the worm provides a smooth precise adjustment without end play or backlash between the worm and worm gear. In addition, the coupling is inherently balanced, allowing high speed operation without undue vibration, accomplished by selecting the placement of the coupling parts and material removal areas so as to maintain such a balanced construction. A more rugged assembly is attained, with larger adjustment components possible, and yet the device may be accurately adjusted.

Statement of the Objects

Accordingly, an object of this invention is to provide an improved angularly adjustable phasing coupling.

On of the chief objects of this invention is to provide a coupling means of maximum simplicity, in construction and operation, capable of being statically and dynamically balanced, and which can be quickly adjusted and locked in the adjusted position, to attain desired phasing displacement when integrated as a mechanical coupling, a gear driving assembly, or the like.

Another main object is to provide a mechanical phase changing device whose physical rotational inertia does not affect the very low torque capacities of the devices to which it may be connected.

Another object is to provide improved worm retaining means for an angularly adjustable phasing coupling.

Still another object is to provide a concealed springloaded drive for an angularly adjustable phasing coupling.

And yet another object is to provide an improved angularly adjustable coupling that is inherently balanced and which may serve as an adjustable hub member for gears or cams, or the like, to provide phase adjustment means for such components or the shafts attached thereto.

These and other objects, features, and attendant advantages of this invention will be pointed out in detail, and will become evident from the following more detailed description of the invention and the accompanying drawing which forms an integral part thereof.

In the drawing figures like reference numerals designate like parts.

DESCRIPTION OF THE PREFERRED EMBODIMENT

Figure 1:
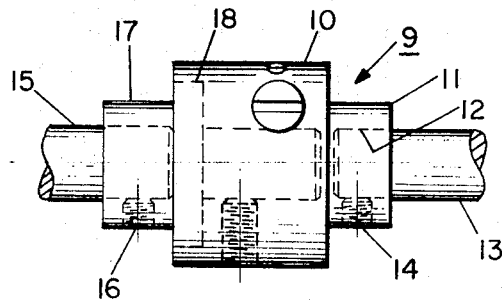
FIG. 1 is a front view of the device showing it coupled to utilization devices.

The construction features of this invention will now be explained. Referring to FIG. 1, the phase adjusting coupling 9 includes an outer adjustment member 10 which has a coupling hub 11 with a central bore 12 that is arranged to receive the driving shaft 13. Set screw 14 rigidly secures shaft 13 to coupling hub 11 of the coupling device. Driven shaft 15 is rigidly secured by set screw 16 to coupling hub 17 of the inner member 18 of the coupling device.

Figure 2:
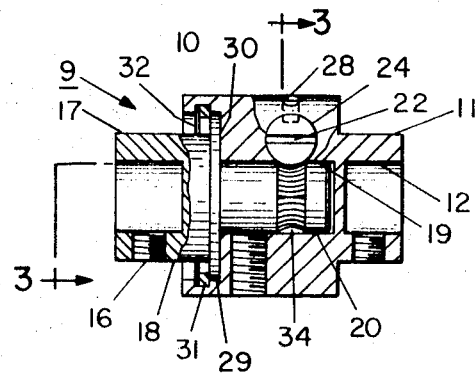
FIG. 2 is a longitudinal view partly in section of this invention.
Figure 3:
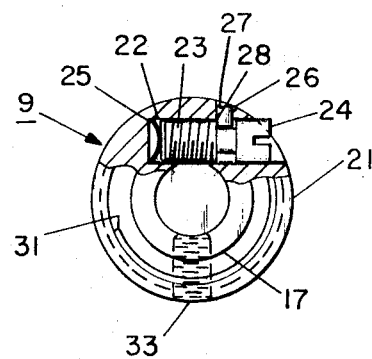
FIG. 3 is an end elevational view of the device, taken along line 3–3 of FIG. 2, showing the driving mechanism of the device.

As shown in FIGS. 2 and 3, the coupling device is comprised of an outer adjustment member 10, and an inner member 18 coaxially disposed therein. Outer adjustment member 10 has a central longitudinal bore 19 arranged to receive reduced diameter section 20 of the inner member 18. Body portion 21 of the outer adjustment member 10 also has a transverse counterbore hole 22, FIG. 3.

Referring again to FIG. 3, a worm screw 23, having a slotted head 24 at one end, is disposed in counter bore hold 22 against a flexible washer 25, such as a spherical segment spring washer, a compressible rubber washer, or the like. Screw 23 has a reduced diameter section 26 located adjacent to the slotted head 24, FIG. 3. Retainer pin 27, secured in bore 28 in outer member 10 and located perpendicular to worm screw 23, acts as a retainer for screw 23. Pin 27 serves to prevent longitudinal axial motion of worm screw 23 in hole 22. Thus, worm screw 23 is captured between flexible washer 25 and pin 27 and prevented from axial movement but has freedom of rotation angularly. Axial loads imparted by the rotation of the worm are taken up by pin 27, thereby permitting very precise adjustment of shafts 13 and 15 in relation to each other. Flexible washer 25 applies longitudinal pressure to end of worm screw 23 to maintain pressure against pin 27, thus, eliminating axial movement within section 26 due to manufacturing tolerances. It will be seen in FIG. 2 that counterbore hole 22 is at right angle to bore 19 and breaks through the wall of the bore. Thus, a small portion of the worm threads extend into bore 19.

Shown in FIG. 2 is the inner member 18 with a transverse flange 29, larger than coupling hub 17, which seats against transverse face 30 of the outer adjustment member 10. The flange 29 can rotate axially within member 10 and is restrained from axial longitudinal motion within member 10 by a retainer ring 31 contained within annular groove 32 near the free end of member 10. Thus, the inner member is prevented from moving axially relative to the outer adjustment member. Worm gear 34 is formed integrally with the reduced diameter section 20 of the inner member and is in the same transverse plane as the axis of worm screw 23 and meshes with it therewith.

Also shown in FIG. 2 is a locking screw 33 utilized for locking the adjustment mechanism.

Reduced diameter section 20 may be angularly rotated by means of the worm and worm gear combination to accurately affect the angular position of driven shaft 15. For example, the ratio of screw driver rotation to the rotation of the coupling may be 32:1. Thus, rotating the worm by the screw driver one-half a revolution or 180° changes the phase angle between the driving and driven shafts 5 ⅝°. Other ratios, of course, can be obtained by changing the threads per inch on the worm.

The invention described herein provides a simple and effective method for retaining and spring loading the worm and preventing its axial movement. Only a simple tool such as a screw driver is required to affect the adjustment of the worm even by unskilled personnel with a minimal of instruction in the phasing adjustment procedure. It will also be seen that the construction described produces an inherently balanced coupling capable of operation at high speed.

It should also be understood that the foregoing disclosure relates only to preferred embodiments of the invention and that it is intended to cover changes and modifications which may be made by those skilled in the art without departing from the scope and spirit of the invention.

I claim:

1. A coupling device for adjusting the phase angle between driving and driven members which comprises:
   an outer adjustment member,
   a driven member,
   said outer adjustment member adapted to be coupled to said inner member,
   first and second axially aligned bores in said outer adjustment member,
   an inner driven member having a portion thereof rotatably disposed within said first and second bores,
   said inner driven member adapted to be secured to said outer adjustment member coaxially therewith,
   a first gear means,
   said first gear means integral with the portion of said inner driven member disposed within said first bore,
   a transverse bore in said outer adjustment member,
   a second gear means,
   said second gear means rotatably disposed within said transverse bore with inner end inwardly of said bore,
   said first and second gear means in operative engagement with each other,
   a pin retaining means,
   said retaining means in said outer adjustment member,
   said retaining means arranged to prevent axial movement of said second gear means while permitting rotational movement thereof,
   a substantially semispherical flexible washer, said flexible washer positioned within said transverse bore in axial alignment with said second gear with a rounded portion in contact with the inner end of said second gear,
   said flexible washer directly applying axial pressure against the end of said second gear and to said pin retaining means,
   a locking means arranged relative to said outer and inner member,
   said locking means preventing angular movement of said outer means relative to said inner means.